(12) United States Patent
Bretzigheimer et al.

(10) Patent No.: US 11,782,070 B2
(45) Date of Patent: Oct. 10, 2023

(54) METHOD FOR DETERMINING THE DIRECTION OF TRAVEL OF A VEHICLE

(71) Applicant: Continental Teves AG & Co. oHG, Frankfurt (DE)

(72) Inventors: Kai Bretzigheimer, Mainz (DE); Mohanad Youssef, Bad Soden am Taunus (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/127,062

(22) Filed: Dec. 18, 2020

(65) Prior Publication Data
US 2021/0190812 A1 Jun. 24, 2021

(30) Foreign Application Priority Data
Dec. 19, 2019 (DE) .................... 10 2019 220 118.0

(51) Int. Cl.
| | | |
|---|---|---|
| *G01P 15/08* | (2006.01) | |
| *G01B 7/30* | (2006.01) | |
| *G01D 5/14* | (2006.01) | |
| *G01P 3/481* | (2006.01) | |

(52) U.S. Cl.
CPC ............... *G01P 15/08* (2013.01); *G01B 7/30* (2013.01); *G01D 5/145* (2013.01); *G01P 3/481* (2013.01)

(58) Field of Classification Search
CPC .......... G01P 15/08; G01P 3/481; G01P 21/00; G01P 13/00; G01P 13/045; G01P 3/487; G01B 7/30; G01D 5/145; B60W 2050/0031; B60W 2050/0052; B60W 2050/0054; B60W 2050/0056;
(Continued)

(56) References Cited

U.S. PATENT DOCUMENTS

| | | | | |
|---|---|---|---|---|
| 6,107,767 A | * | 8/2000 | Lu ........................... | B62D 5/046 318/432 |
| 8,489,299 B2 | * | 7/2013 | Murray ................... | G01P 21/00 701/87 |

(Continued)

FOREIGN PATENT DOCUMENTS

| | | | | |
|---|---|---|---|---|
| DE | 19654769 A1 | * | 7/1998 | ......... B60K 31/0008 |
| DE | 102007012833 A1 | | 9/2008 | |

(Continued)

OTHER PUBLICATIONS

Machine translation of EP1972888 (Year: 2008).*
(Continued)

*Primary Examiner* — Alesa Allgood
*Assistant Examiner* — Sangkyung Lee

(57) ABSTRACT

A method for determining the direction of travel of a vehicle comprises providing a first sensor for measuring a longitudinal acceleration of the vehicle and at least one second sensor for establishing the rotational movement of a wheel of the vehicle, An acceleration signal containing acceleration information from the first sensor is received by the system. The acceleration signal is filtered resulting in a modified acceleration signal. The direction of travel of the vehicle is determined based on the modified acceleration signal and based on the output signal of the second sensor.

12 Claims, 3 Drawing Sheets

(58) Field of Classification Search
CPC ....... B60W 2520/105; B60W 2520/28; B60W 40/10; B62D 15/0285
See application file for complete search history.

(56) References Cited

U.S. PATENT DOCUMENTS

| | | | | |
|---|---|---|---|---|
| 8,843,272 B2* | 9/2014 | Okita | ................ | B60W 40/09 |
| | | | | 701/36 |
| 2006/0040777 A1* | 2/2006 | Gartner | ................ | G01P 13/04 |
| | | | | 475/34 |
| 2017/0225710 A1 | 8/2017 | Yu et al. | | |
| 2019/0359203 A1* | 11/2019 | Isshiki | ................ | B60W 30/02 |

FOREIGN PATENT DOCUMENTS

| | | | | | |
|---|---|---|---|---|---|
| DE | 102012025104 A1 * | 1/2014 | | ........... | G01P 13/045 |
| DE | 102017101455 A1 | 8/2017 | | | |
| DE | 102017007122 A1 | 3/2018 | | | |
| DE | 112012001297 T5 | 12/2018 | | | |
| EP | 1173350 A2 * | 1/2002 | | ......... | B60R 21/0132 |
| EP | 1972888 A2 * | 9/2008 | | ......... | B60W 40/076 |
| WO | 02062640 A1 | 8/2002 | | | |

OTHER PUBLICATIONS

Machine translation of EP1173350 (Year: 2000).*
Machine translation of DE102012025104A1 (2014).*
Machine translation of DE19654769 (Year: 1998).*
German Search Report dated Jan. 21, 2020 for corresponding German Patent Application No. 10 2019 220 118.0.

* cited by examiner

METHOD FOR DETERMINING THE DIRECTION OF TRAVEL OF A VEHICLE

CROSS-REFERENCE TO RELATED APPLICATIONS

This U.S. patent application claims the benefit of German patent application No. 10 2019 220 118.0, filed Dec. 19, 2019, which is hereby incorporated by reference.

TECHNICAL FIELD

The invention relates to a method for determining the direction of travel of a vehicle based on acceleration information.

BACKGROUND

Vehicles having the ability to drive at least partially autonomously are already known. In particular, vehicles having parking assistance systems, by means of which a vehicle can be automatically parked in a parking space, are known. During such automatic parking operations, it is necessary to determine or to estimate the location and alignment of the vehicle precisely, in order to be able to guide the vehicle in a collision-free manner on a planned parking trajectory into a final parking position.

During the parking operation it is possible that the vehicle will change its direction of travel between parking moves. The direction of travel must likewise be determined or estimated in order to avoid errors in the position estimation. In particular, determining the direction of travel is critical when the vehicle starts, i.e. starts moving from a standstill. In the event that the direction of travel is not determined or is determined too late or incorrectly, it will not be possible to track the vehicle movement or it will be assumed that the vehicle is moving in the wrong direction. If the direction of travel is recognized too late after starting, this will result in unacceptable errors in the position estimation for automated parking.

The problem of solutions which are known from the prior art is that these only make it possible to determine the direction of travel with a long delay and above a certain speed value, so that it is not possible to determine the direction of travel immediately after the vehicle starts and/or in the event of a rapid change in the direction of travel which can occur, for example, when driving over a curb. Thus, a wheel speed sensor supplies the rotational direction of the wheels, for example, only after three edges of the encoder wheel have been recognized, i.e. the vehicle has for example already driven approx. 10 cm before the direction of travel is recognized.

Therefore, a method for determining the direction of travel of a vehicle, which already makes it possible to accurately determine the direction of travel shortly after the vehicle starts and at low speed, for example a speed of less than 0.2 m/s is desireable.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for determining a vehicle direction of travel comprises measuring a longitudinal acceleration of the vehicle with a first sensor and establishing rotational movement of a wheel of the vehicle with at least one second sensor. A second sensor is preferably assigned to each wheel and said items of information provided by the second sensors are at least partially jointly evaluated. The first sensor can be for example a sensor of an inertial measuring unit or a sensor of the braking system. The at least one second sensor can be for example a sensor of the braking system. The latter can be for example an inductively operating sensor (e.g. Hall sensor). Depending on the angular velocity of the wheel, the second sensor can provide a time-variable pulsed signal. In particular, the angular velocity of the wheel can be deduced by way of the temporal distance of two edges of the output signal of the second sensor.

An acceleration signal containing acceleration information is subsequently provided by the first sensor. This acceleration information may result from a movement of the vehicle, for example the starting of the vehicle, a change of direction, etc.

The acceleration signal is subsequently filtered, resulting in a modified acceleration signal. Thanks to the filtering of the acceleration signal, interference, in particular offsets, due to an inclination of the vehicle (for example by standing on an oblique plane or a slope) can be compensated for.

The direction of travel of the vehicle is lastly established based on the modified acceleration signal and based on the output signal of the second sensor. The output signal of the second sensor is in particular used in order to be able to determine the time of the evaluation of the modified acceleration signal for the determination of the direction of travel. It is possible to ascertain by means of the second sensor that the vehicle has started or changed direction.

Therefore, the direction of travel of the vehicle can already be captured immediately after the vehicle starts moving, even at low speed, and it is therefore possible to control the driving process, in particular the parking operation, accurately.

According to an exemplary embodiment, the filtering of the acceleration signal comprises a lowpass filtering. Thanks to the lowpass filtering it is possible to compensate for or at least attenuate unwanted ancillary effects such as, for example, the vehicle being located on a slant, which can lead to an erroneous assessment of the direction of travel. The lowpass filtering may be deactivated at least intermittently, for example depending on the vehicle speed or depending on other vehicle or driving situation parameters.

According to an exemplary embodiment, during the determination of the direction of travel of the vehicle, the lowpass-filtered acceleration signal and the acceleration signal provided by the first sensor or derived therefrom are compared. The term "derived acceleration signal" may beat used to denote a signal which is obtained by a signal processing. The signal processing can, for example, comprise a further filtering of the signal. Thanks to this comparison, erroneous direction of travel information resulting from the vehicle decelerating or starting moving in a jerky manner can preferably be avoided or at least attenuated.

According to an exemplary embodiment, during the determination of the direction of travel of the vehicle, the deviation between the acceleration signal provided by the first sensor or derived therefrom and the lowpass-filtered acceleration signal is determined. When the vehicle is stationary, the lowpass-filtered acceleration signal approaches the acceleration signal provided by the first sensor or derived therefrom, which can contain an offset due to a slope inclination. On starting, the acceleration signal provided by the first sensor or derived therefrom increases more rapidly than the lowpass-filtered acceleration signal. The difference of both signals supplies the direction of travel. As a result, an offset created by the slope gradient can be compensated for.

According to an exemplary embodiment, during the determination of the direction of travel of the vehicle, the difference is calculated between the acceleration signal provided by the first sensor or derived therefrom and the lowpass-filtered acceleration signal and, based on the sign of the result of the calculated difference, the direction of travel is determined. As a result, the accuracy of the direction of travel determination can be further increased.

According to an exemplary embodiment, the filtering of the acceleration signal comprises a filtering by means of a band-stop filter. As a result, vibration movements of the vehicle body, which are created when the vehicle decelerates or starts, can be at least partially filtered out.

According to an exemplary embodiment, the band-stop filter filters out a frequency band which comprises the vibration frequency of the vehicle following a deceleration or acceleration process. The filter function of the band-stop filter can be dimensioned as a function of the respective vehicle with a fixed filter characteristic, since the vibration behavior of a vehicle is relatively constant and can therefore be effectively compensated for by a fixedly predefined filter characteristic.

In the case of adaptively adjustable suspension systems, the filter function can be adapted, for example by selecting a specific filter function from multiple different, predefined filter functions.

According to an exemplary embodiment, the band-stop filter has a transfer function inversely to the mass-spring-damper model of the vehicle. Thanks to this inverse transfer function, the vibration behavior of the suspension system can be compensated for so that the vibrations measured by the acceleration sensor can at least be compensated for to the greatest possible extent.

According to an exemplary embodiment, the band-stop filter has the following transfer function:

$$G = \frac{a_2 s^2 + a_1 s + a_0}{b_1 s + b_0} \cdot \frac{1}{T_{add}^2 + 2 T_{add} s + 1};$$

wherein the following applies:

$$a_2 = \frac{1}{\omega_0^2}; a_1 = \frac{2D}{\omega_0}; a_0 = 1; b_1 = \frac{2D}{\omega_0}; b_0 = 1;$$

This transfer function can be implemented in a technically simple manner and makes it possible to effectively compensate for the vibrational movements of the vehicle.

According to an exemplary embodiment, the parameters of the above transfer function are selected as follows:

$D=0.2;$ $\omega_0 = 2*\pi*2.5$ Hz; and $T_{add} = 0.04 s;$

According to an exemplary embodiment, the filtering of the acceleration signal comprises multiple consecutive filtering steps, and indeed a first filtering step by means of a band-stop filter and a second filtering step, in which the signal is filtered by a lowpass filter following the filtering by the band-stop filter. As a result, unwanted vibrations can be filtered out prior to the lowpass filtering. However, rapid, in particular sudden, signal modifications can pass through the band-stop filter so that the lowpass filter retains its effect in the filter arrangement or filter cascade.

According to an exemplary embodiment, the direction of travel of the vehicle is determined as a function of the temporal progress of the output signal of the second sensor. In other words, it is determined based on the output signal of the second sensor at which time the acceleration signal modified by the filtering is evaluated in order to determine the direction of travel of the vehicle. For example, the modified acceleration signal is evaluated immediately after the vehicle starts or changes direction, wherein the fact that the vehicle is starting to move, for example after being stopped or following a change of direction, can be captured by way of the output signal of the second sensor.

According to an exemplary embodiment, the direction of travel of the vehicle is determined immediately following the receipt of an edge of the output signal of the second sensor. The second sensor is preferably configured to provide a time-dependent output signal having edges. This can for example be a square-wave signal. The modified acceleration signal is preferably evaluated immediately after receiving the first edge (ascending or descending) of the output signal of the second sensor (i.e. immediately after the vehicle starts) and, as a result, the direction of travel of the vehicle is determined.

According to another aspect, a system for determining the direction of travel of a vehicle comprising a first sensor for measuring a longitudinal acceleration of the vehicle and at least one second sensor for establishing the rotational movement of a wheel of the vehicle. The system is configured to receive an acceleration signal containing acceleration information from the first sensor; to filter the acceleration signal, resulting in a modified acceleration signal; and to determine the direction of travel of the vehicle based on the modified acceleration signal and based on the output signal of the second sensor.

According to yet another aspect a vehicle has the previously described system.

The term "parking operation" is used within the meaning of the present disclosure to denote operations, in which a vehicle is maneuvered forward, backward, sideways or diagonally into a parking space. During the parking operation the driver can be located in the vehicle or outside of the vehicle (remote parking operation). A "parking operation" can be the operation of parking in and leaving a parking space.

The term "parking assistance system" is used within the meaning of the present invention to denote any systems which support the driver during the parking operation and which make possible at least a partially automated parking operation.

The expressions "approximately", "substantially" or "roughly" within the meaning of the invention mean deviations from the exact value in each case of +/−10%, or for example of +/−5% and/or deviations in the form of alterations which are not of main importance for the function.

Further developments, advantages and possible applications of the invention are also set out by the following description of exemplary embodiments and by the figures. All of the features described and/or pictured, whether alone or in any combination, essentially form the subject-matter of the invention, independently of the summary thereof in the claims or references back thereto. The content of the claims is also made an integral part of the description.

BRIEF DESCRIPTION OF THE FIGURES

The invention is explained in greater detail below by means of exemplary embodiments with reference to the figures, wherein.

DETAILED DESCRIPTION

Figure 1:
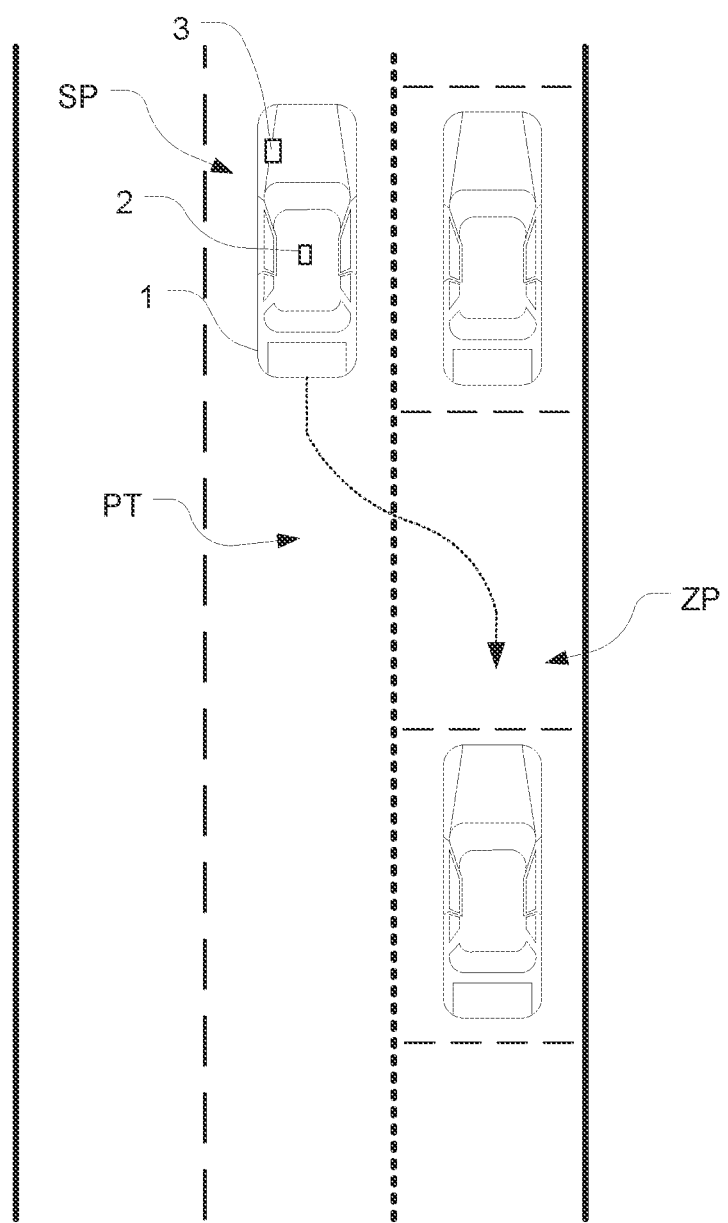
FIG. 1 shows, by way of example and schematically, a vehicle having sensor technology in the proximity of a longitudinal parking position which is not occupied.

FIG. 1 shows a vehicle 1 in the environment of a longitudinal parking situation, in which an available parking position between two vehicles is not occupied. The vehicle 1 has a parking assistance system, by means of which the vehicle 1 can be parked in an at least partially automated manner in the parking position which is not occupied. During the parking operation, the vehicle 1 is maneuvered by the parking assistance system along a parking trajectory PT from a starting position SP into a target position ZP. Such a parking trajectory PT is depicted by way of example in FIG. 1. The target position ZP of the vehicle 1 can, as in the depicted case, be reached by a single parking move. Alternatively, it is however possible that in order to reach the parking position, multiple moves are necessary, for example three parking moves, wherein the direction of travel is altered between the individual parking moves. In order to ensure that the vehicle 1 is moving on the calculated parking trajectory PT, it is necessary to capture the direction of travel of the vehicle 1 as exactly as possible, including in the event of the direction of travel altering suddenly, as happens for example when driving against a curb or similar.

In order to determine the direction of travel, the vehicle has a system which comprises at least one first sensor 2 and one second sensor 3. The first sensor 2 is configured to measure the longitudinal acceleration of the vehicle 1 (longitudinal acceleration sensor). The first sensor 2 is preferably a sensor of the inertial measuring unit of the vehicle or a sensor which is assigned to the braking system of the vehicle, e.g. a sensor of the electronic stability control (ESC). The second sensor 3 is for example a sensor, by means of which the vehicle movement can be captured, for example a sensor for determining the rotational movement of a wheel (wheel speed sensor). The second sensor 3 is, for example, configured to provide pulses as a function of the angular velocity of the wheel, which allow conclusions to be drawn regarding the movement of the vehicle. The second sensor 3 can, for example, be an inductive sensor, e.g. a Hall sensor. It can therefore be ascertained by means of the second sensor 3 whether the wheel of the vehicle 1 is rotating or the angle by which the wheel has rotated. For example, a starting of the vehicle 1 or a change of direction can be detected. The second sensor 3 may be formed by a group of sensors which contains multiple individual sensors, for example in each case one individual sensor per wheel of the vehicle 1.

In order to achieve a determination of the direction of travel of the vehicle 1 which is as exact as possible, the measuring signal provided by the first sensor 2, hereinafter referred to as an acceleration signal, is subjected to filtering.

The filtering can, on the one hand, comprise a lowpass filtering. Distortions of the acceleration signal, which are created, for example, due to offsets and/or an inclination of the vehicle (for example resulting from the vehicle driving on an inclined surface), can be compensated for by means of the lowpass filtering. For example, it can be achieved by means of a lowpass filtering of the acceleration signal that, due to a distortion, the acceleration signal has an erroneous sign and, therefore, an erroneous direction of travel of the vehicle 1 is deduced.

The modified acceleration signal obtained by the lowpass filtering may be compared to the acceleration signal provided by the first sensor 2 or an acceleration signal derived therefrom and the direction of travel of the vehicle 1 is determined on the basis of the signal comparison.

The deviation of the acceleration signal provided by the first sensor 2 and of the signal at the output of the lowpass filter may be established (difference calculated) and the sign of the result of the difference calculated is utilized in order to determine the direction of travel of the vehicle 1. The direction of travel of the vehicle may be captured as a temporal function of a signal component received from the second sensor 3. The signal provided by the second sensor may be a time-variable signal having pulse edges, e.g. a square-wave signal, the frequency of which depends on the rotational speed of the wheel. The direction of travel of the vehicle 1 may be established when, after the vehicle has been stopped for a while, an edge of a pulse of the output signal of the second sensor 3 is received again.

The filtering of the acceleration signal may comprise a band-stop filtering. If a vehicle 1 is decelerated abruptly, for example down to a standstill, the springs on one axle are compressed and the springs on the other axle are relieved. Following the standstill, this leads to a damped vibration of the vehicle chassis which can last multiple seconds and distorts the acceleration signal. During this time, the vehicle 1 can, however, already start moving again so that the direction of movement of the vehicle 1 has to be determined. Thanks to the band-stop filtering it is possible to determine the direction of movement of the vehicle 1 sufficiently accurately, even during the vibration of the vehicle chassis.

The filter function of the band-stop filter is selected such that the oscillation frequency is filtered out, whereas signal components in other frequency ranges can pass through the band-stop filter. Signal components which are created during jerky movements of the vehicle 1 can pass through the band-stop filter. It should be mentioned here that the oscillation frequency and the damping of the acceleration signal are preferably virtually constant due to the suspension of the vehicle in the case of a predefined vehicle type and, therefore, a filter function of a band-stop filter having fixedly predefined filter characteristics can be used in order to filter out disturbing oscillations.

A spring-damper model of the vehicle 1 is preferably used in order to define the filter function of the band-stop filter and the filter function of the band-stop filter is selected inversely to the spring-damper model of the vehicle 1, in order to filter out the oscillations of the vehicle 1.

For example, the transfer function of the band-stop filter has the following transfer function:

$$G = \frac{a_2 s^2 + a_1 s + a_0}{b_1 s + b_0} \cdot \frac{1}{T_{add}^2 + 2T_{add} s + 1};$$

wherein the following applies:

$$a_2 = \frac{1}{\omega_0^2}; a_1 = \frac{2D}{\omega_0}; a_0 = 1; b_1 = \frac{2D}{\omega_0}; b_0 = 1;$$

Figure 2:
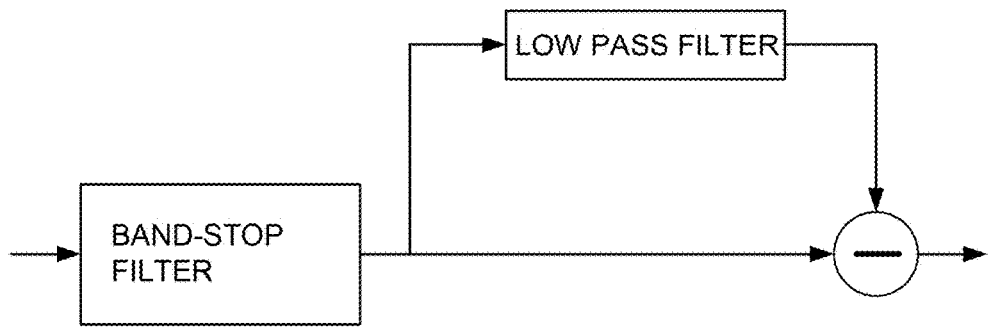
FIG. 2 shows, by way of example and schematically, a filter arrangement for filtering an acceleration signal of an acceleration sensor.

The parameters of the transfer function can in particular be selected as follows:

$D=0.2$;

$\omega_0 = 2*\pi*2.5$ Hz; and $T_{add}=0.04s$;

FIG. 2 shows a schematic representation of a filter cascade for filtering the acceleration signal provided by the first sensor 2.

The acceleration signal provided by the first sensor 2 is received by the filter arrangement and initially filtered by the band-stop filter, in order to filter out the vibrations described above resulting from the rocking of the sprung body.

The output signal provided by the band-stop filter is subsequently used as an input signal of a lowpass filter, in order to avoid the deviations previously described or drifts for example due to the vehicle 1 being tilted.

The output signal of the filter cascade or filter arrangement may be formed by calculating the difference between the output signal of the lowpass filter and the output signal of the band-stop filter. Alternatively, the difference can be calculated between the output signal of the lowpass filter and the input signal of the band-stop filter, i.e. in particular the unfiltered acceleration signal of the first sensor 2. The direction of travel of the vehicle 1 can be determined based on this output signal of the filter cascade or the filter arrangement.

Figure 3:
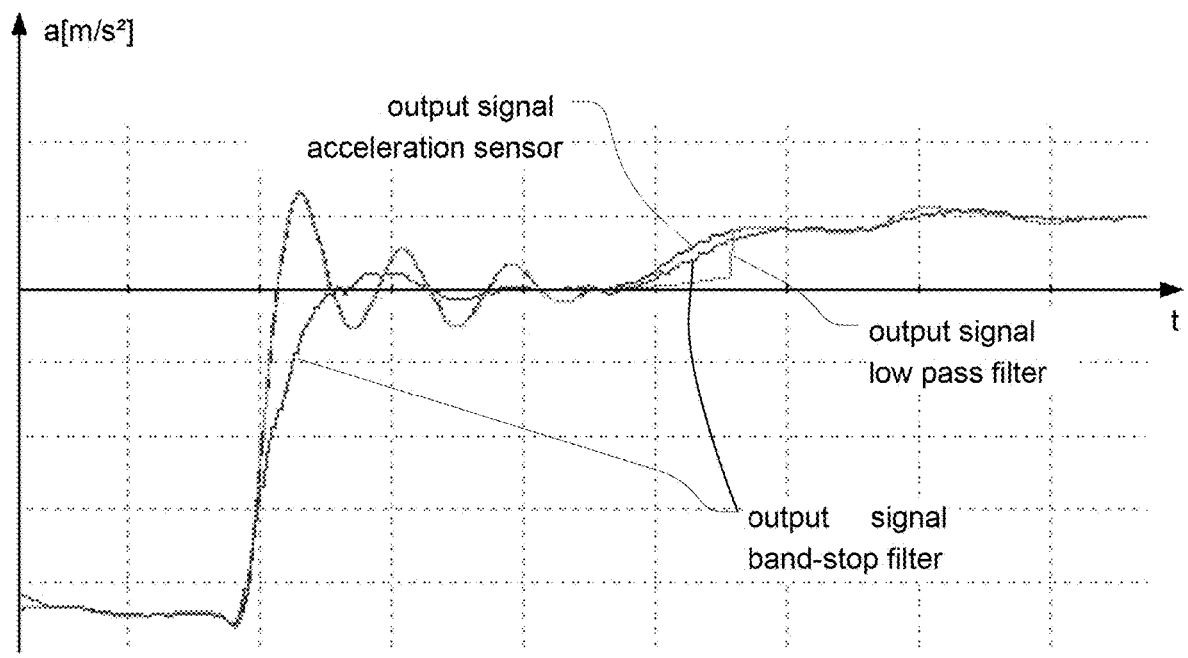
FIG. 3 shows, by way of example, multiple time charts which show the unfiltered acceleration signal of the acceleration sensor, the acceleration signal filtered with a band-stop filter and the acceleration signal filtered with a lowpass filter.

FIG. 3 shows the temporal progress of the acceleration signal which is provided by the first sensor 2, the temporal progress of the output signal of the band-stop filter and the temporal progress of the output signal of the lowpass filter.

The top representation shows the temporal progress of the acceleration signal which is provided by the first sensor 2, the middle representation shows the temporal progress of the output signal of the band-stop filter and the lower representation shows the temporal progress of the output signal of the lowpass filter.

It can be seen from the temporal progresses that the postoscillation of the acceleration signal can be significantly reduced by the band-stop filter following a deceleration or acceleration process. The lowpass filtering brings about an equalization of erratic alterations in the acceleration signal.

Figure 4:
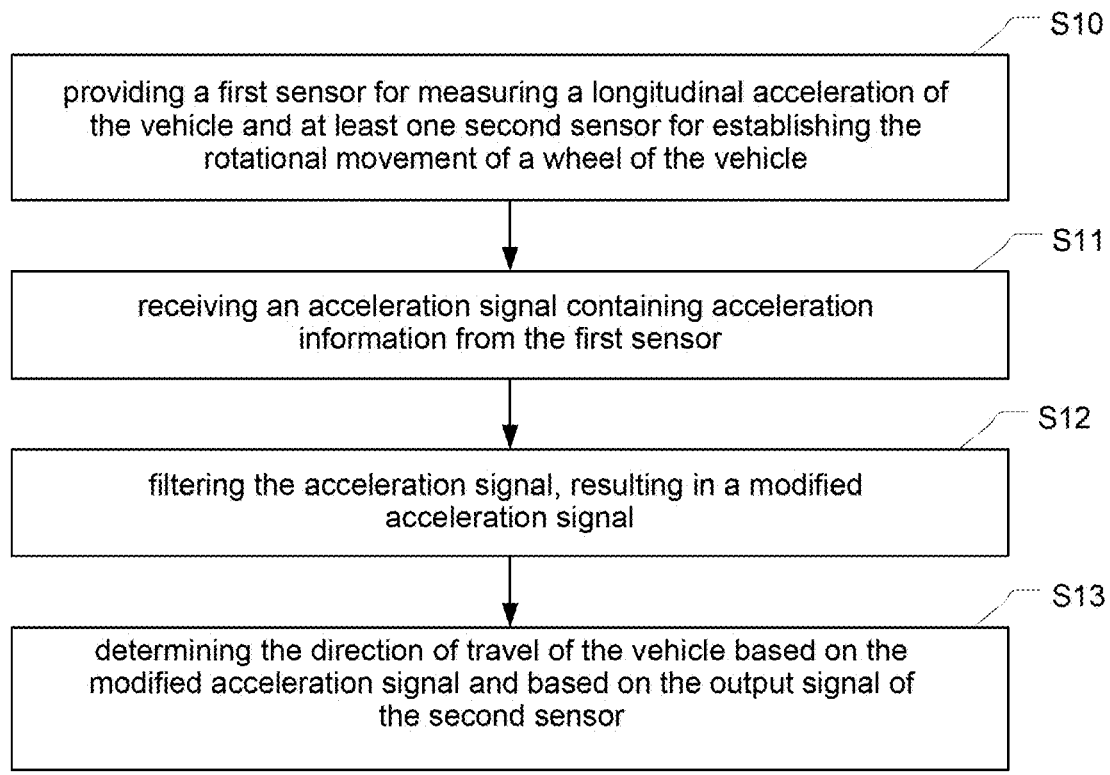
FIG. 4 shows, by way of example, a flow chart which illustrates the steps of the method for determining the direction of travel of a vehicle.

FIG. 4 shows a schematic representation of the steps of a method for determining the direction of travel of a vehicle 1.

A first sensor 2 for measuring a longitudinal acceleration of the vehicle 1 and a second sensor 3 for establishing the rotational movement of a wheel of the vehicle 1 are initially provided (S10).

An acceleration signal containing acceleration information is subsequently received from the first sensor 2 (S11).

The acceleration signal is filtered in a further method step, resulting in a modified acceleration signal (S12).

The direction of travel of the vehicle 1 is lastly determined based on the modified acceleration signal and based on the output signal of the second sensor 3 (S13).

The invention has been described above with reference to exemplary embodiments. It is understood that numerous alterations as well as modifications are possible, without departing from the scope of protection defined by the claims.

The invention claimed is:

1. A method of determining a direction of travel of a vehicle, the method comprising:
   measuring a longitudinal acceleration of the vehicle based on an acceleration signal of a first sensor configured to measure the longitudinal acceleration of the vehicle;
   detecting that the vehicle starts to move from a standstill or changes direction based on rotational movement of a wheel of the vehicle indicated by a first ascending edge or a first descending edge of a time dependent output signal of a second sensor configured to determine rotational movement of the wheel;
   filtering the acceleration signal resulting in a modified acceleration signal, the filtering including band-stop filtering the acceleration signal to filter out oscillations of the vehicle from the acceleration signal, and lowpass filtering of the band-stop filtered acceleration signal;
   determining the direction of travel of the vehicle based on a difference between the modified acceleration signal and one of the acceleration signal or the band-stop filtered acceleration signal immediately after either the vehicle starts to move from a standstill or changes direction based on the time dependent output signal of the second sensor; and
   autonomously controlling driving of the vehicle based on the direction of travel,
   wherein determining the direction of travel of the vehicle is based on the difference between the modified acceleration signal and the acceleration signal.

2. The method according to claim 1, wherein determining the direction of travel comprises:
   determining the direction based on a sign of the difference.

3. The method according to claim 1, wherein the band-stop filtering filters out a frequency band which comprises a frequency of the oscillations of the vehicle following deceleration or acceleration of the vehicle.

4. The method according to claim 1, wherein the band-stop filtering has a transfer function inverse to a mass-spring-damper model of the vehicle.

5. The method according to claim 4, wherein the band-stop filtering has a transfer function as follows:

$$G = \frac{a_2 s^2 + a_1 s + a_0}{b_1 s + b_0} \cdot \frac{1}{T_{add}^2 + 2T_{add} s + 1};$$

and wherein the following applies:

$$a_2 = \frac{1}{\omega_0^2}; a_1 = \frac{2D}{\omega_0}; a_0 = 1; b_1 = \frac{2D}{\omega_0}; b_0 = 1;$$

wherein G is the transfer function, $a_x$ and $b_x$ are general coefficients, $\omega_0$ is a resonant circuit frequency, Tada is a circulation time, s=is a path length, and D is a damping degree.

6. The method according to claim 5, wherein the parameters are selected as follows:

$$D=0.2;$$

$$\omega_0=2*\pi*2.5 \text{ Hz; and}$$

$$T_{add}=0.04s.$$

7. A system for determining a direction of travel of a vehicle, the system comprising:
- a first sensor configured to measure a longitudinal acceleration of the vehicle;
- a second sensor configured to detect rotational movement of a wheel of the vehicle,
- a processor configured to receive an acceleration signal of the vehicle from the first sensor, filter the acceleration signal resulting in a modified acceleration signal by band-stop filtering the acceleration signal to filter out oscillations of the vehicle from the acceleration signal to generate a band-stop filtered acceleration signal, and by lowpass filtering of the band-stop filtered acceleration signal, detect that the vehicle starts to move from a standstill or changes direction based on the rotational movement of the wheel of the vehicle indicated by a first ascending edge or a first descending edge of a time dependent output signal from the second sensor, determine the direction of travel of the vehicle based on a difference between the modified acceleration signal and one of the acceleration signal or the band-stop filtered acceleration signal, the direction of travel being determined immediately after either the vehicle starts to move from a standstill or changes direction based on the time dependent output signal of the second sensor, and autonomously control driving of the vehicle based on the direction of travel,
wherein determining the direction of travel of the vehicle is based on the difference between the modified acceleration signal and the acceleration signal.

8. The system according to claim 7, wherein where the processor is configured to determine the direction based on a sign of the difference.

9. The method according to claim 1, further comprising temporarily deactivating the lowpass filtering depending upon a speed of the vehicle or a driving parameter of the vehicle or of another vehicle.

10. The system according to claim 7, wherein the processor is further configured to temporarily deactivate the lowpass filtering depending upon a speed of the vehicle or a driving parameter of the vehicle or of another vehicle.

11. The method of claim 1, wherein the lowpass filtering filters out distortions of the acceleration signal from an inclination of the vehicle.

12. The system according to claim 7, wherein the lowpass filter filters out distortions of the acceleration signal from an inclination of the vehicle.

* * * * *